Aug. 7, 1923.

J. DAWSON 1,464,410

BACKSTOP FOR VEHICLES

Filed May 12, 1922

Inventor
James Dawson,

By
Attorney

Patented Aug. 7, 1923.

1,464,410

UNITED STATES PATENT OFFICE.

JAMES DAWSON, OF BELT, MONTANA.

BACKSTOP FOR VEHICLES.

Application filed May 12, 1922. Serial No. 560,313.

*To all whom it may concern:*

Be it known that JAMES DAWSON, a citizen of the United States of America, residing at Belt, in the county of Cascade and State of Montana, has invented new and useful Improvements in Backstops for Vehicles, of which the following is a specification.

The object of the invention is to provide a means readily applicable to vehicles particularly of the motor driven type for preventing backward or retrograde movement on grades in the event that the engine should become stalled, to avoid the necessity of applying the brakes to prevent accident with the consequent inconvenience of starting a forward movement of the car from a braked condition; and with this object in view the invention consists in a construction and combination of parts of which a preferred embodiment is shown in the accompanying drawings, wherein:—

Figure 1:
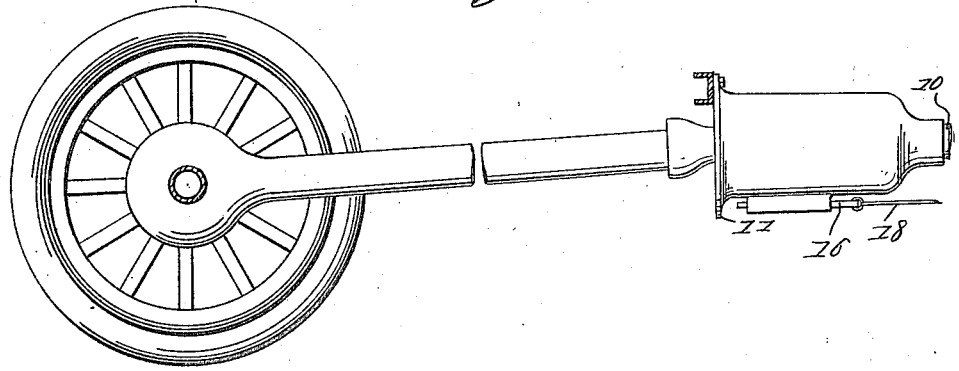
Figure 1 is a side view.
Figure 2:
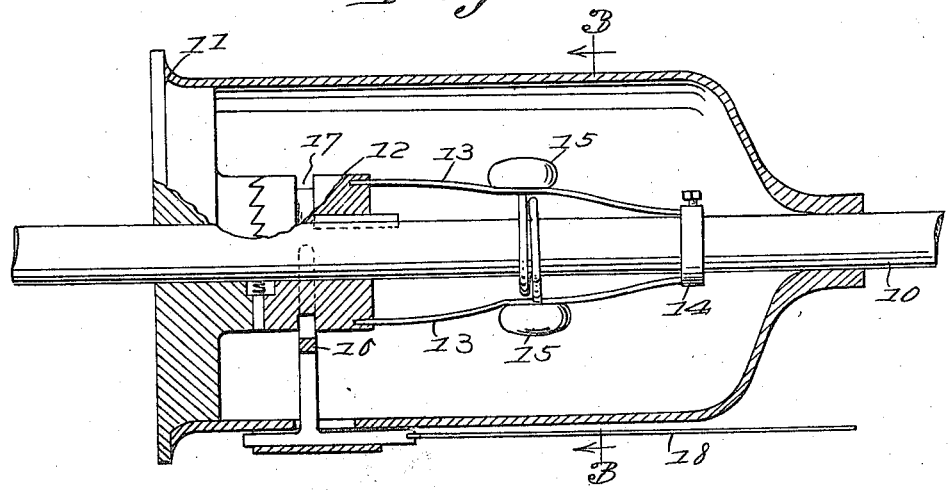
Figure 2 is a sectional view of an apparatus embodying the invention applied in the operative position to a vehicle.
Figure 3:
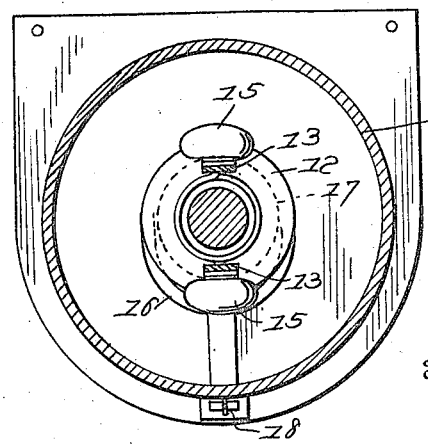
Figure 3 is a transverse sectional view of the same on the plane indicated by the line 3—3 of Figure 2.

The apparatus is applicable to the drive shaft 10 of a vehicle between the transmission gear and the rear or driving axle and consists essentially of a clutch having the stationary clutch member or block 11 and the rotary clutch member 12 rotatable with and keyed to the drive shaft for longitudinal movement to effect engagement and disengagement of the clutch faces which may be ratchet toothed as shown.

Connected with the movable clutch member is a centrifugal actuating means for said member consisting in the construction illustrated of springs 13 terminally connected with the clutch member 12 and a collar 14 fixed to the drive shaft and carrying the weights 15 so that when the drive shaft is in motion the effect of the weights is to draw the movable clutch member out of engagement with the fixed clutch member or block. Obviously when the rotation of the drive shaft ceases the inward movement of the weights due to the action of the springs 13 serves to swing the clutch members into engagement to lock the drive shaft against reverse rotary movement.

In order to permit of the reversing or backward movement of the car when required a yoke 16 is engaged with a peripheral channel 17 in the movable clutch member and to this yoke is connected the operating means such as a cord or chain 18 extending to within convenient reach of the driver of the car for actuation by a suitable lever, foot pedal or any equivalent thereof (not shown).

Thus while the safety stop or clutch may be held out of operation when it is desired to back the car, it is ordinarily in position to operate as soon as the forward rotation of the drive shaft ceases to prevent retrograde movement as when the car is stopped or the engine stalls while ascending a grade, without requiring any attention on the part of the operator or necessitating the setting of the brakes until the engine can be restarted.

Having described the invention, what is claimed as new and useful is:—

1. A back stop for motor driven vehicles having, in combination with the drive shaft, a clutch consisting of a fixed clutch member and a movable clutch member keyed to and rotatable with the drive shaft and longitudinally movable into engaging relation with the fixed clutch member, and centrifugally controlled means carried by the drive shaft for withdrawing the movable clutch member from engagement with the fixed clutch member.

2. A back stop for motor driven vehicles having, in combination with the drive shaft, a clutch consisting of a fixed clutch member and a movable clutch member keyed to and rotatable with the drive shaft and longitudinally movable into engaging relation with the fixed clutch member, and centrifugally controlled means carried by the drive shaft for withdrawing the movable clutch member from engagement with the fixed clutch member, and consisting of springs connected with the movable clutch member and carrying weights for effecting the outward bowing thereof.

3. A back stop for motor driven vehicles having, in combination with the drive shaft, a clutch consisting of a fixed clutch member and a movable clutch member keyed to and rotatable with the drive shaft and longitudinally movable into engaging relation with the fixed clutch member, and centrifugally controlled means carried by the drive shaft for withdrawing the movable clutch member from engagement with the fixed clutch member, together with manually operable means for opening the clutch to permit of backing movement of the vehicle.

In testimony whereof he affixes his signature.

JAMES DAWSON.